United States Patent
Kato et al.

(10) Patent No.: US 6,817,593 B2
(45) Date of Patent: Nov. 16, 2004

(54) SLIDE GATE VALVE FOR POWDER AND GRANULAR MATERIAL

(75) Inventors: Fumio Kato, Handa (JP); Yoshio Sakakibara, Handa (JP)

(73) Assignee: Tsukasa Industry Co., Ltd., Handa (JP)

( * ) Notice: Subject to any disclaimer, the term of this patent is extended or adjusted under 35 U.S.C. 154(b) by 126 days.

(21) Appl. No.: 10/204,753

(22) PCT Filed: Feb. 23, 2001

(86) PCT No.: PCT/JP01/01335

§ 371 (c)(1),
(2), (4) Date: Aug. 23, 2002

(87) PCT Pub. No.: WO01/63155

PCT Pub. Date: Aug. 30, 2001

(65) Prior Publication Data

US 2003/0155543 A1 Aug. 21, 2003

(30) Foreign Application Priority Data

Feb. 23, 2000 (JP) ........................................ 2000-046105

(51) Int. Cl.⁷ ............................................... F16K 1/44
(52) U.S. Cl. ....................................... 251/175; 251/328
(58) Field of Search ............................... 251/167, 170, 251/174, 175, 214, 326, 328

(56) References Cited

U.S. PATENT DOCUMENTS

| | | | | |
|---|---|---|---|---|
| 3,559,948 A | * | 2/1971 | Grove | 251/174 |
| 3,625,480 A | * | 12/1971 | Hoos | 251/326 |
| 4,334,550 A | * | 6/1982 | Connor et al. | 251/175 |
| 4,356,838 A | * | 11/1982 | Morello | 251/326 |
| 4,415,139 A | * | 11/1983 | Potts | 251/328 |
| 4,512,359 A | | 4/1985 | Hinojosa et al. | 137/315 |
| 4,693,447 A | | 9/1987 | Perez | 251/129.12 |
| 4,798,365 A | * | 1/1989 | Mayhew | 251/326 |
| 5,020,776 A | * | 6/1991 | Owens et al. | 251/328 |
| 5,413,140 A | | 5/1995 | Kimpel et al. | 137/375 |
| 6,082,706 A | * | 7/2000 | Irie | 251/203 |
| 6,206,376 B1 | * | 3/2001 | Hartman et al. | 251/175 |

FOREIGN PATENT DOCUMENTS

| | | | |
|---|---|---|---|
| JP | 564578 | 8/1993 | |
| JP | 6-74349 | 3/1994 | ............ F16K/3/02 |
| JP | 11-201299 | 7/1999 | ............ F16K/3/02 |
| JP | 2001-304430 | * 10/2001 | |
| WO | 93/00536 | 1/1993 | ............ F16K/3/02 |

* cited by examiner

Primary Examiner—J. Casimer Jacyna
(74) Attorney, Agent, or Firm—Antonelli, Terry, Stout & Kraus, LLP

(57) ABSTRACT

A sealing member includes a gland packing pressed into a wide, flat, ring-shaped seal housing to seal a sliding portion of a gate plate. The seal housing has a bamboo shoot-like shape or a bevel-like shape structure in front and cross sectional view and includes wide ring-shaped or oval shaped steps and a rear step. An inner wall of the seal housing has an included face that abruptly rises to be oriented almost perpendicular to the axis of the gate plate, in the sliding direction, a ring-shaped face that is extended from the included face to be oriented almost parallel to the axis, the step that is extended from the ring-shaped face, a ring-shaped face that is similar to the ring-shaped face and is extended from the step, the step that is extended from the ring-shaped face, a ring-shaped face that is similar to the ring-shaped face and is extended from the step, and an opening end that is extended from the ring-shaped face.

3 Claims, 16 Drawing Sheets

(a)

(b)

SLIDE GATE VALVE FOR POWDER AND GRANULAR MATERIAL

BACKGROUND OF THE INVENTION

The present invention relates to a slidable gate valve for powder and granular material that actuates a gate to open and close a powder and granular material transport path, and more specifically a sealing construction of the slidable gate valve.

A prior art slidable gate valve 501 for powder and granular material is shown in FIGS. 15 and 16. A frame body 504 has an opening 503 and includes an inlet hopper 540 and an outlet hopper 542 linked with each other by a base frame 544. A gate plate holder 546 for receiving a gate plate 502 connecting with an air cylinder 505 is joined with the frame body 504. The air cylinder 505 is further joined with the gate plate holder 546. A sealing member 509 (for example, including a gland packing) is attached to one end of the gate plate holder 546 to seal the gate plate 502 from the gate plate holder 546. A guide rail 513 is formed below the inlet hopper 540 to guide the gate plate 502. The air cylinder 505 extends the gate plate 502 to close the opening 503, while contracting the gate plate 502 to open the opening 503. This arrangement accordingly opens and closes a vertical transport path of powder and granular material. The slidable gate valve 501 for powder and granular material is connected to external air equipment and power equipment.

The rectangular gate valve is used for square and rectangular exhaust ports and is applicable for discharge of powder and granular material from conveyors or reservoirs. The circular gate valve is used for circular exhaust ports and is applicable for discharge of powder and granular material from silos and check bottles. The simple and easily-maintained sealing mechanism suitable for the respective applications is adopted for the enhanced sealing property.

Although there is a seal of the clearance between the gate plate holder 546 and the frame body 504, sealing of the moving path of the powder and granular material from the outside is still insufficient. There is a clearance between the gate plate 502 and the lower end of the inlet hopper 540 in the frame body 504 in order to prevent potential troubles, for example, to reduce the friction resistance of the gate plate 502 for the smooth sliding movement and to ensure the sufficient strength of the gate plate 502 for supporting the pressure of the accumulating powder and granular material. Even in the closed state of the gate plate 502, the powder and granular material are leaked down through the clearance. The insufficient sealing property in the moving path of the powder and granular material causes problems, such as leakage of the air and powder and granular material. The positive pressure in the upper area of the gate plate 502 results in a worse leakage.

The object of the present invention is thus to prevent leakage of powder and granular material in its moving path in a closed state of a gate plate, as well as leakage of powder and granular material out of the moving path in the course of opening and closing the gate plate.

SUMMARY OF THE INVENTION

In order to attain at least part of the above and other related objects, the present invention is directed to a slidable gate valve for powder and granular material, which includes: a frame body with an opening; an actuator attached to the frame body; a holder case connected to the frame body; a gate plate that is slid by the actuator in a direction perpendicular to a moving path of the powder and granular material, so as to open and close the opening; a ring-shaped sealing member that is attached to a through hole formed in a specific area of the frame body on a side of the holder case and seals the gate plate from the frame body, so as to prevent leakage of the powder and granular material out of the moving path; and a support member that supports the gate plate, wherein the sealing member includes a seal pressed into a seal housing with a step. This arrangement gives a variation in sealing pressure and thus effectively prevents leakage of the powder and granular material out of the moving path. The holder case may receive the slidable gate plate and accommodate an electric part and a hydraulic part. The support member may support the gate plate in the closed state or may be constructed like a guide rail to guide the sliding motion of the gate plate. The seal housing may have one or multiple steps.

In one preferable application of the slidable gate valve for powder and granular material as described above, the seal housing has a ring-shaped face inclined relative to a direction of the sliding movement of the gate plate. This arrangement gives a place-dependent variation in sealing pressure and thereby more effectively prevents leakage of powder and granular material out of the moving path.

In another preferable application of the slidable gate valve for powder and granular material as described above, the slidable gate valve further includes a second sealing member to seal a clearance between the frame body and the gate plate in the closed state of the opening and thereby prevent leakage of the powder and granular material in the moving path. This arrangement effectively prevents leakage of powder and granular material out of the moving path as well as in the moving path. The second sealing member is required to prevent leakage when the powder and granular material are fine powder, but may not be required when the powder and granular material are rough powder or granular material sufficiently large in size relative to the clearance. The second sealing member is, for example, a polymer material having a triangular or rectangular cross section and preferably has a labyrinth seal structure for the enhanced sealing property, although not essential.

The present invention is also directed to another slidable gate valve for powder and granular material, which includes: a frame body with an opening; an actuator attached to the frame body; a holder case connected to the frame body; a gate plate that is slid by the actuator in a direction perpendicular to a moving path of the powder and granular material, so as to open and close the opening; a sealing member that includes a packing pressed into a seal housing attached to a through hole formed in a specific area of the frame body on a side of the holder case and seals the gate plate from the frame body, so as to prevent leakage of the powder and granular material out of the moving path; and a support member that supports the gate plate, wherein the actuator is an air cylinder, and exhaust of the air cylinder is induced into the seal housing. The exhaust discharged in the course of actuation of the gate plate by the air cylinder raises the pressure in the seal housing and thus more effectively prevents leakage of powder and granular material out of the moving path. The sealing member may have any adequate construction.

The present invention is further directed to still another slidable gate valve for powder and granular material, which includes: a frame body with an opening; an actuator attached to the frame body; a holder case connected to the frame body; a gate plate that is slid by the actuator in a direction perpendicular to a moving path of the powder and granular material, so as to open and close the opening; a first sealing member that is attached to a specific area of the frame body on a side of the holder case and seals the gate plate from the frame body, so as to prevent leakage of the powder and granular material out of the moving path; a support member that supports the gate plate; and a second sealing member that seals a clearance between the frame body and the gate plate in the closed state of the opening with the gate plate, wherein a certain area of the second sealing member, which is in contact with the gate plate, forms a labyrinth seal structure to prevent leakage of the powder and granular material in the moving path. Invading powder and granular material are trapped by the labyrinth seal structure to enhance the sealing property and thus effectively prevent leakage of powder and granular material in the moving path. The first sealing member may be a ring-shaped gland packing or may be a packing or another seal pressed into a seal housing with multiple steps.

In one preferable embodiment of the slidable gate valve for powder and granular material in accordance with the present invention as described above, the support member includes a guide rail that props up and guides the gate plate and is attached to the frame body to be extended in a direction of the sliding movement, and the gate plate is interposed and slid between the sealing member and the guide rail to open and close the opening. This arrangement effectively attains the object described above, and besides prevents the gate plate in the closed state from being bent due to load of the powder and granular material accumulating on the gate plate, thus attaining the enhanced strength and the improved durability. The structure of this embodiment ensures smooth sliding movement of a relatively large-sized gate plate.

In another preferable embodiment of the slidable gate valve for powder and granular material of the present invention as described above, the support member includes at least two projections that are disposed in an inner area of the frame body and prop up the gate plate when the gate plate closes the opening. This arrangement effectively attains the object described above, and supports the gate plate in the closed state, so as to prevent the gate plate in the closed state from being bent due to load of the powder and granular material accumulating on the gate plate, thus attaining the enhanced strength and the improved durability.

DETAILED DESCRIPTION OF THE INVENTION

Figure 1:
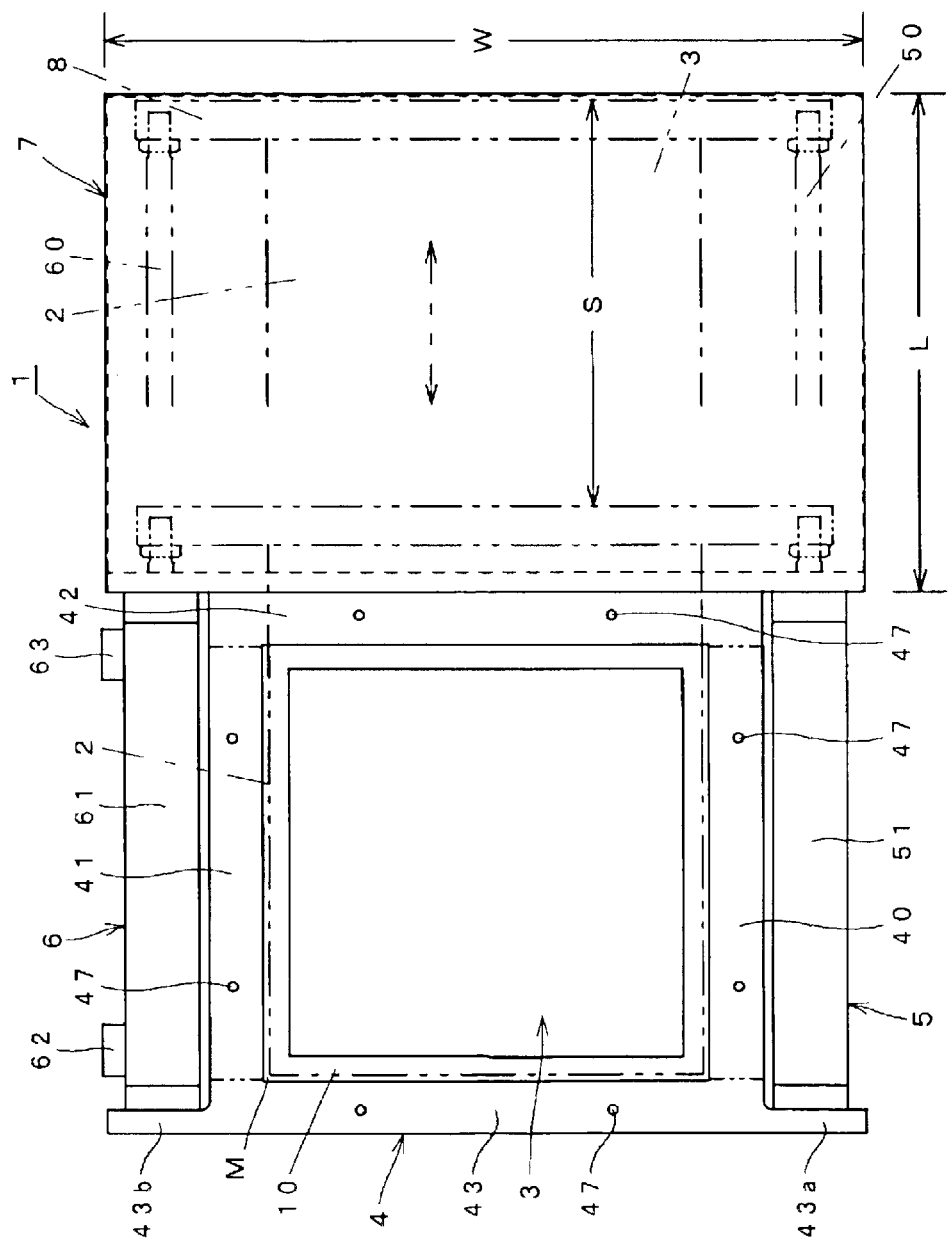
FIG. 1 is a plan view illustrating a slidable gate valve for powder and granular material in a first embodiment of the present invention.
Figure 2:
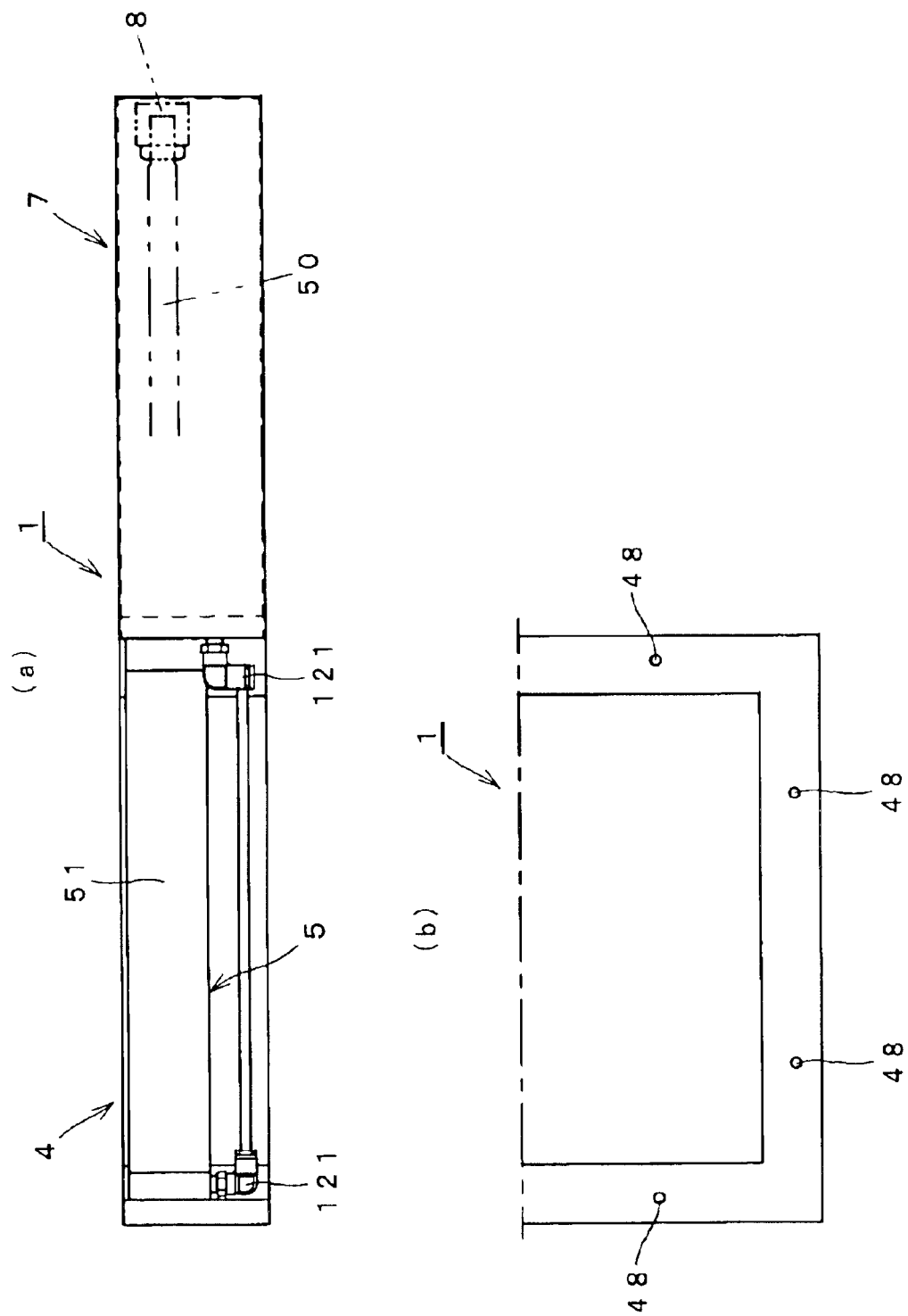
FIG. 2(a) is a front view and FIG. 2(b) is a bottom view of the slidable gate valve.
Figure 3:
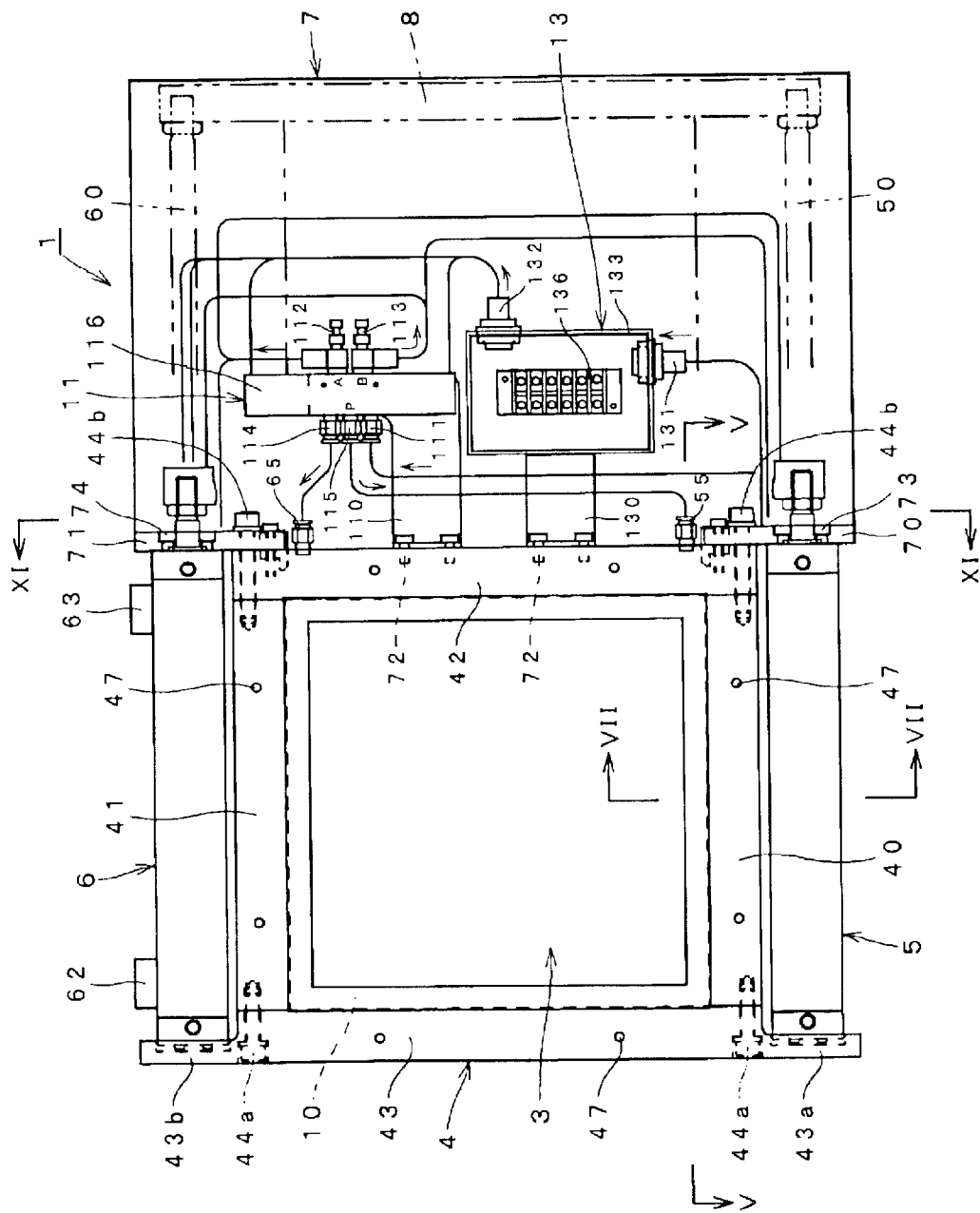
FIG. 3 is a plan view illustrating the internal structure of the slidable gate valve.

A slidable gate valve 1 for powder and granular material (hereinafter referred to as the gate valve 1) in a first embodiment of the present invention is discussed below with reference to FIGS. 1 through 11. As shown in FIGS. 1 through 3, the gate valve 1 of this embodiment is connected to an outlet port of a powder and granular material processing device, for example, a dust collector, a cyclone separator, a conveyor, a reservoir, a silo, a check bottle, a blender, a screw feeder linked with a transport pipe for transporting powder material used for foods, medicines, chemicals, and other purposes. The gate valve 1 opens and closes the outlet port to allow and prohibit discharge of the powder and granular material to downstream. The gate valve 1 includes a gate plate 2 that has a quasi-square shape seen from the top, a rectangular shape seen from the front, and a wide, flat, oval ring shape seen from the side, a frame body 4 with an opening 3 that is a casing in which the gate plate 2 is incorporated in a movable manner, a pair of air cylinders 5 and 6 that are hydraulic actuators to open and close the gate plate 2, and a holder case 7 joined with the frame body 4. The gate plate 2 has a right end fixed to a coupling rod 8 and is disposed in the frame body 4 in a horizontally slidable manner as shown by the two-dot chain line in FIG. 1. The air cylinders 5 and 6 have piston rods 50 and 60, whose respective ends are orthogonally fixed to the coupling rod 8. The air cylinders 5 and 6 functions to slide the gate plate 2 in a predetermined direction, that is, in a horizontal direction. In the extended state of the air cylinders 5 and 6, the gate plate 2 is received in the holder case 7 to open the opening 3. In the contracted state of the air cylinders 5 and 6, the gate plate 2 closes the opening 3. Namely the air cylinders 5 and 6 press the gate plate 2 to open the opening 3, while dragging the gate plate 2 to close the opening 3. A sealing member 9 (see FIG. 6) is fixed to a through hole formed in the frame body 4 on the side of the holder case 7 to prevent the gate plate 2 with powder and granular material adhering thereto from being received in the holder case 7. A rectangular sealing member 10 is fixed as an inner frame to the inner circumference of the opening 3, that is, inside the frame body 4 as the outer frame to seal the gate plate 2 from the frame body 4. An air unit 11 and an electric unit 13 are disposed in the holder case 7. The respective constituents are described in detail below.

Description of Frame Body 4

The frame body 4 consists of a plurality of metal (for example, aluminum) block members linked with one another. As shown in FIGS. 1 through 3, the frame body 4 has two side frame members 40 and 41 that are arranged in parallel across a preset interval in the sliding direction of the gate plate 2, and a front frame member 42 and a rear frame member 43 that are perpendicular to the side frame members 40 and 41 and are linked with the side frame members 40 and 41. The pair of air cylinders 5 and 6 are disposed outside and parallel to the side frame members 40 and 41. The respective base ends of cylinder tubes 51 and 61 are attached to air cylinder fixation elements 43a and 43b formed on both ends of the rear frame member 43. The front ends of the cylinder tubes 51 and 61 and the front face of the front frame member 42 are attached to fixation elements 70 and 71 (see FIG. 3) on both ends of the holder case 7, for example, with screws. A guide slot 46 is formed in the front frame member 42 to receive the gate plate 2 inserted therein. The sealing member 9 is attached to the guide slot 46. The side frame members 40 and 41 are long block members that have a rectangular cross section and are shorter than the length of the gate plate 2. The front frame member 42 and the rear frame member 43 are long block members that have a rectangular cross section and are wider than the width of the gate plate 2. As shown in FIG. 1, while the gate plate 2 closes the opening 3, a clearance M is present to prevent potential troubles in actuation and is sealed with the sealing member 10. The side frame members 40 and 41, the front frame member 42, and the rear frame member 43 are linked with bolts 44a and 44b (see FIG. 3). The sealing member 10 is fixed to the front frame member 42 and the rear frame member 43 via support members 44d with bolts 44c (see FIG. 8). Guide rails 14 and 15 described later are attached to the front frame member 42 and the rear frame member 43 of the frame body 4, for example, with bolts (not shown).

A plurality of connection apertures 47 and 48 used for linkage with flanges of couplings of the powder material processing device are pierced in the top face and the bottom face of the side frame members 40 and 41, the front frame member 42, and the rear frame member 43. These connection apertures 47 and 48 have dimensions and positions that are substantially identical with those of connection apertures pierced in the flanges of the couplings of the powder material processing device.

The top face and the bottom face of the frame body 4 in the gate valve 1 of the embodiment are in contact with the flanges of the upstream and downstream couplings of the powder material processing device. The gate valve 1 is linked with the powder material processing device, for example, bolts fitted in the connection apertures 47 and 48 and the connection apertures (not shown) in the flanges of the couplings of the powder material processing device.

Figure 15:
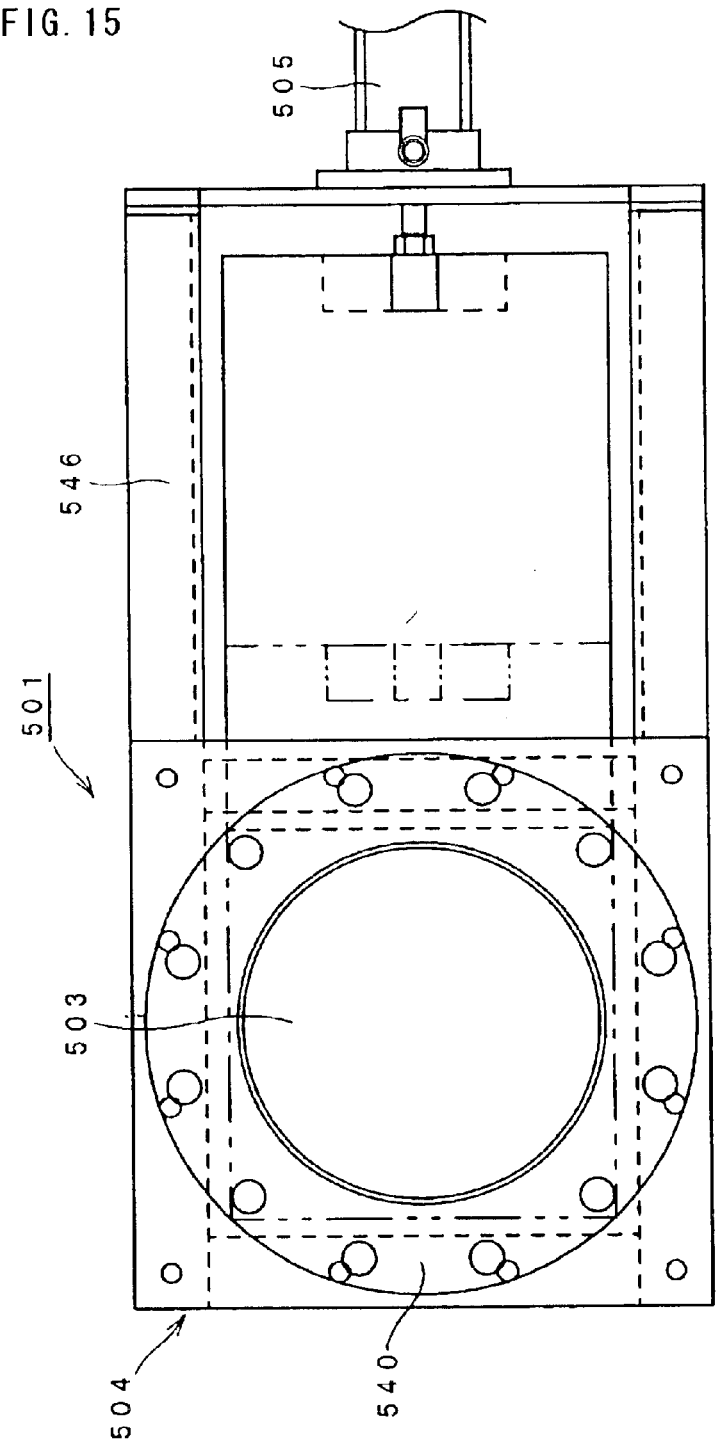
FIG. 15 is a plan view illustrating the internal structure of a prior art slidable gate valve for powder and granular material.
Figure 16:
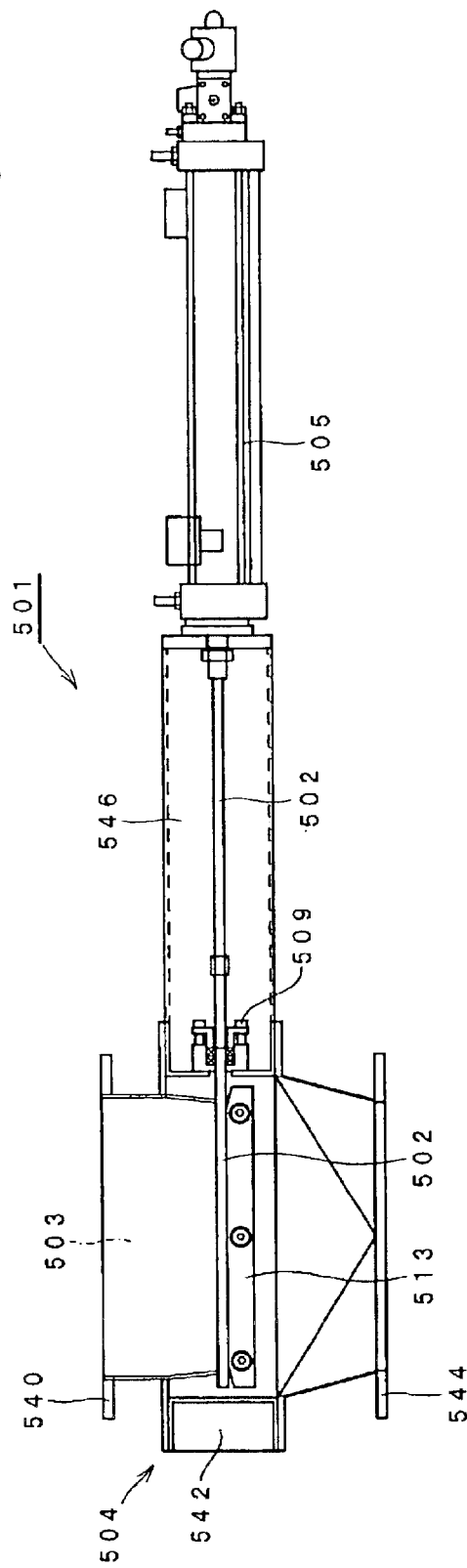
FIG. 16 is a front view illustrating the internal structure of the prior art slidable gate valve.

In the prior art slidable gate valve 501 for powder and granular material shown in FIGS. 15 and 16, the gate plate 502 is pressed to the closed position and dragged to the open position. The gate valve 501 has a portion for receiving the dragged gate plate 502. The air cylinder 505 is protruded outside, and the length of the air cylinder 505 along its axis is at least three times the length of the gate. There is accordingly a high demand of size reduction. In the structure of the embodiment, the gate plate 2 is dragged to the closed position and pressed to the open position. This arrangement significantly shortens the length of the air cylinders 5 and 6 in the sliding direction, thus attaining size reduction and cost reduction.

Figure 4:
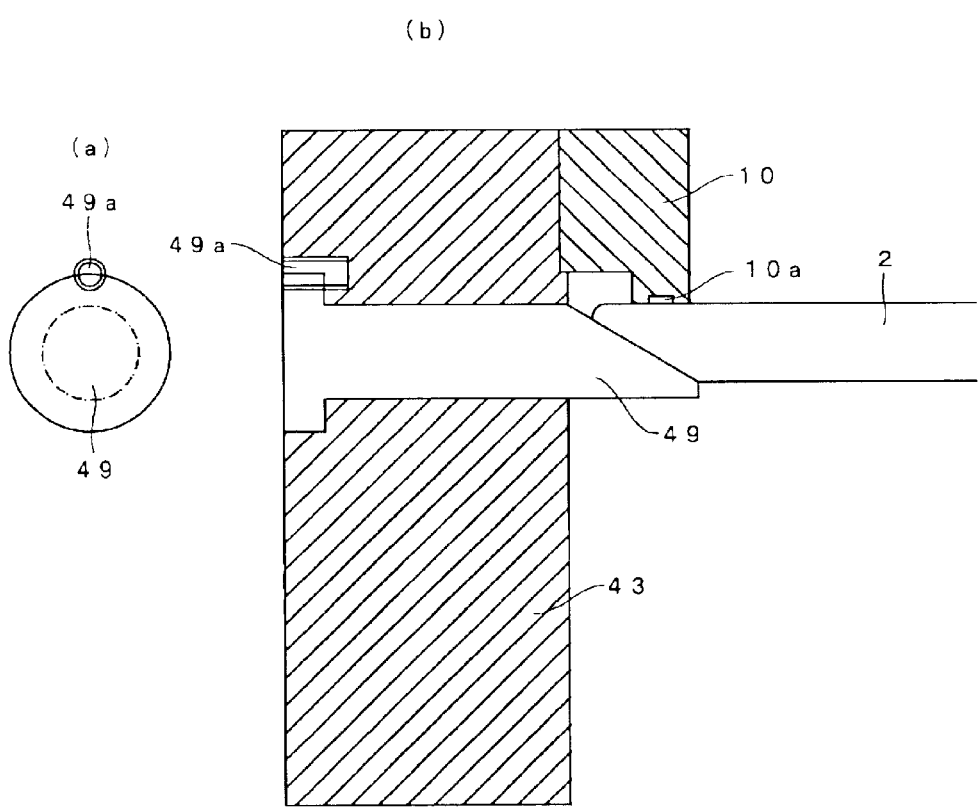
FIG. 4(a) is a partial side view illustrating a modified structure of the slidable gate valve.
FIG. 4(b) is a side sectional view of the modified structure.
Figure 5:
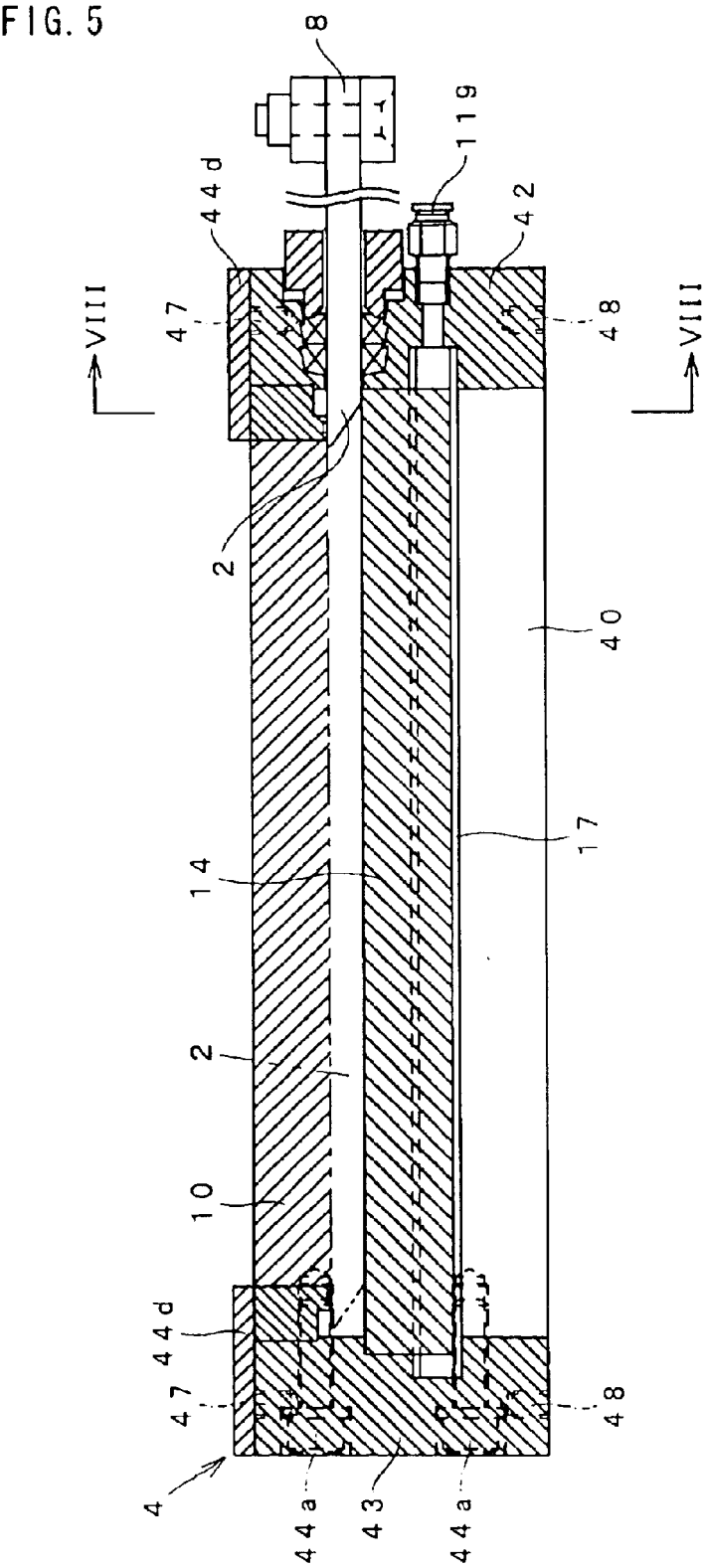
FIG. 5 is a sectional view taken on the line V—V in FIG. 3.

A pair of guide rails 14 and 15 are disposed below the gate plate 2 to prop up the gate plate 2. The gate plate 2 is accordingly interposed between the sealing member 10 and the guide rails 14 and 15. The guide rails 14 and are coated with a resin film. The surface of the gate plate 2 may also be coated with the resin film. The resin film has low friction resistance and high wear resistance, so as to reduce the friction resistance applied to the sliding faces of the guide rails 14 and 15 and the gate plate 2 and improve the durability. Pipes 17 and 18 are disposed in parallel to each other below the guide rails 14 and 15. Open grooves 16 (see FIG. 7) are vertically formed in the upper portions of the pipes 17 and 18 to be extended in their longitudinal direction. The lower ends of the guide rails 14 and 15 are inserted downward into the open grooves 16 of the pipes 17 and 18, and the upper open ends of the pipes 17 and 18 are fitted in grooves formed on both sides of the guide rails 14 and 15. The pipes 17 and 18 are fixed to the inner areas of the front frame member 42 and the rear frame member 43 via preset spaces. Air purges 119 and 120 are respectively attached to the ends of the pipes 17 and 18. The pipes 17 and 18 have slits 21 and 22 (see FIG. 7) extended in the longitudinal direction to make upper diagonal and horizontal air jets. The air blows off the powder and granular material, which may accumulate on the bolts and other internal elements, so as to effectively prevent internal contamination of different powder and granular material for foods, medicines, and chemicals. The exhaust of the air cylinders 5 and 6 is effectively used for the air supply. A guide rail regulation screw 23 (see FIG. 6(a)) is used to adjust the vertical positions of the pipes 17 and 18 and regulate the fine clearances between the gate plate 2 and the guide rails 14 and 15. In the case where the opening 3 has a relatively small area and accordingly the gate plate 2 has a small protrusion as shown in FIG. 4, the guide rails 14 and 15 may be omitted. In such cases, a pair of projections (or protrusion plates) 49, for example, of short round bars having tapered planes to face the gate plate 2 may be fixed to the rear frame member 43. The end of the gate plate 2 is also formed to have a tapered plane. In the closed position of the opening 3, the tapered planes engage with each other, so that the gate plate 2 is supported forcibly. This simplifies the construction. The projections 49 are fixed to the rear frame member 43 with screws 49a. The sealing member 10 seals the upper area of the gate plate 2, and the gate plate 2 is clamped and fixed between the projections 49 and the sealing member 10.

Description of Air Cylinders 5 and 6

The piston rods 50 and 60 of the air cylinders 5 and 6 are moved back and forth by the high-pressure air. The ends of the piston rods 50 and 60 are linked with the coupling rod 8 arranged perpendicular thereto. The gate plate 2 is extended to the left area of the coupling rod 8. The air cylinders 5 and 6 receive power supply from the electric unit 13 and a supply of high-pressure air from the air unit 11. Actuation of the air cylinders 5 and 6 is controlled in response to electric signals output from the electric unit 13.

Sensor switches 62 and 63 (see FIGS. 1 and 3) are disposed on either end of a cylinder case 61 to specify the limit of the back and forth movement of the gate plate 2. Namely the movable (extendable) area of the piston rods 50 and 60 of the air cylinder 5 and 6 is set to close the opening 3 with the gate plate 2 in the contracted most position and open the opening 3 of the frame body 4 to its maximum level in the extended most position.

Description of Holder Case 7

The holder case 7 is a rectangular box for the purpose of dust control and is rectangular seen from the top. The respective ends of the front frame member 42 and the cylinder tubes 51 and 61 are fastened with bolts 72, 73, and 74. The height of the holder case 7 is specified to receive the piston rods 50 and 60, the air unit 11, and the electric unit 13. The length L of the inner space of the holder case 7 is set to be not less than the stroke S of the air cylinders 5 and 6. The width W of the holder case 7 is set to be not less than the interval between the outer edges of the cylinder tubes 51 and 61 as shown in FIG. 1. The holder case 7 is joined with the frame body 4 in a continuous plane to give good appearance.

Description of Sealing Member 9

Figure 6:
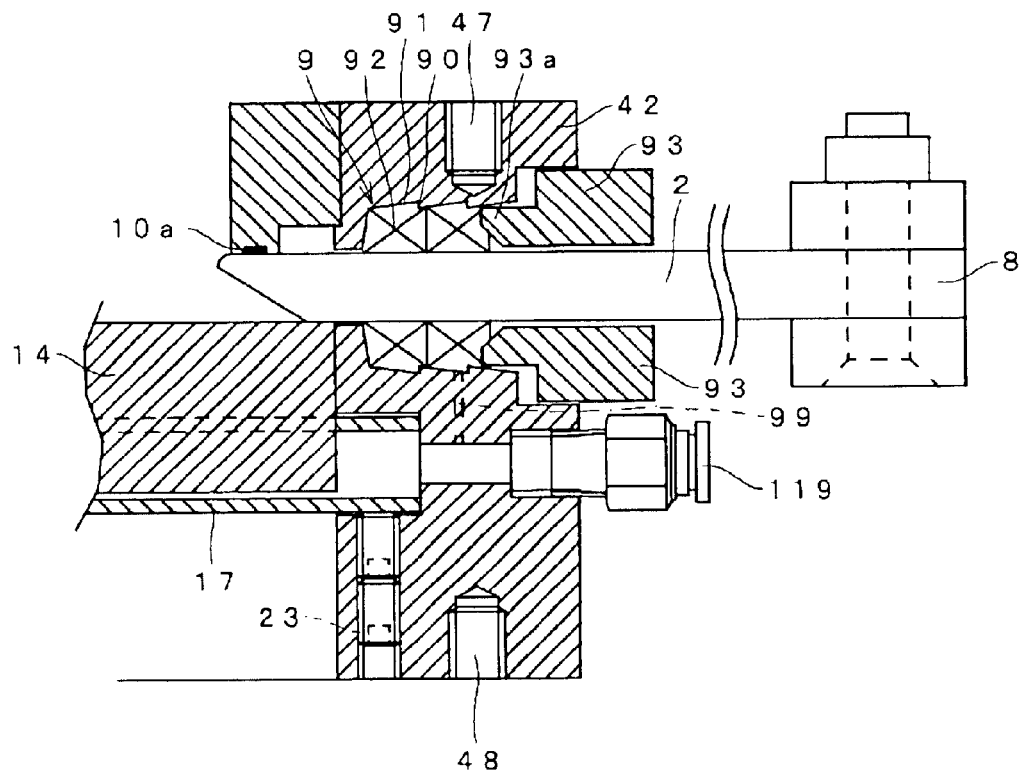
FIG. 6(a) is a partial enlarged sectional view of FIG. 5
FIG. 6(b) is a sectional view illustrating a seal housing.
Figure 6:
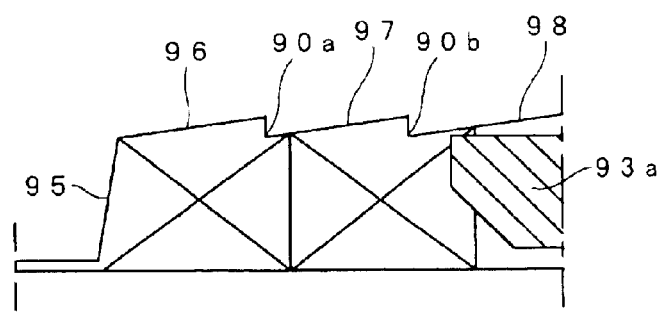
Figure 7:
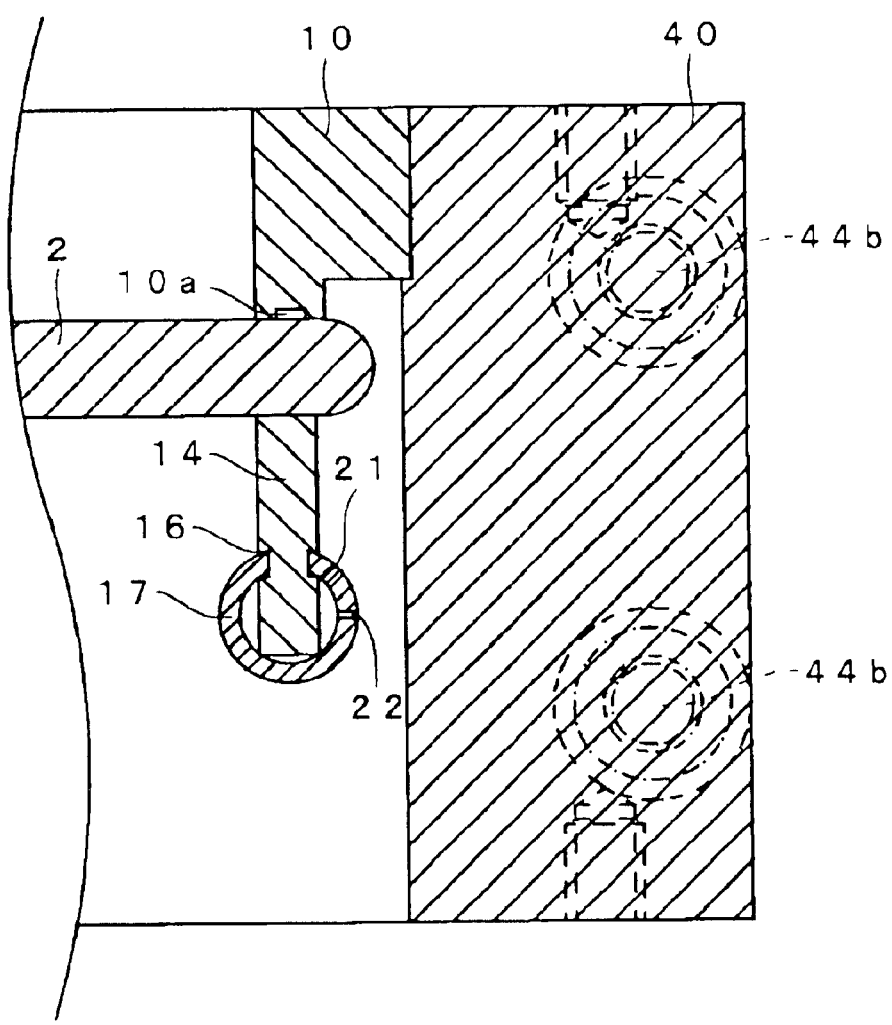
FIG. 7 is a sectional view taken on the line VII—VII in FIG. 3.
Figure 8:
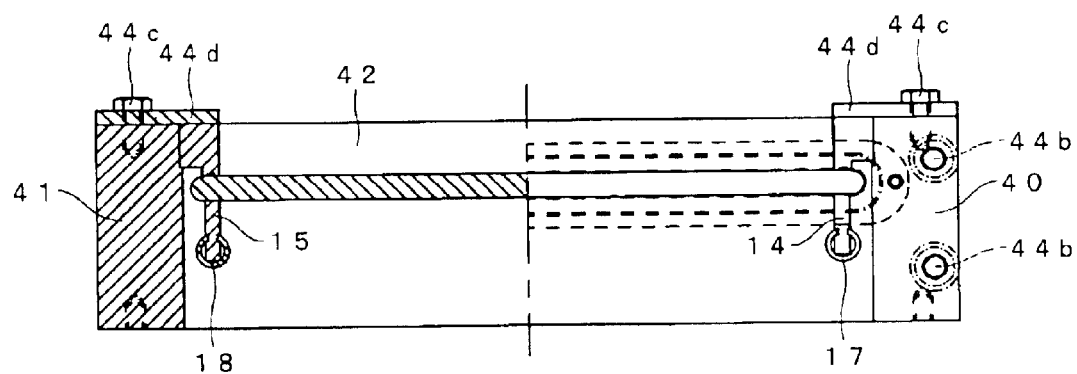
FIG. 8 is a sectional view taken on the line VIII—VIII in FIG. 5.
Figure 9:
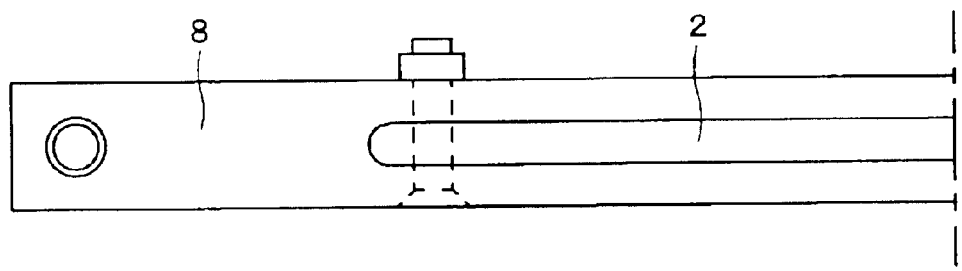
FIG. 9 is a right side view illustrating a coupling rod and a gate plate of the slidable gate valve for powder and granular material in the first embodiment.
Figure 10:
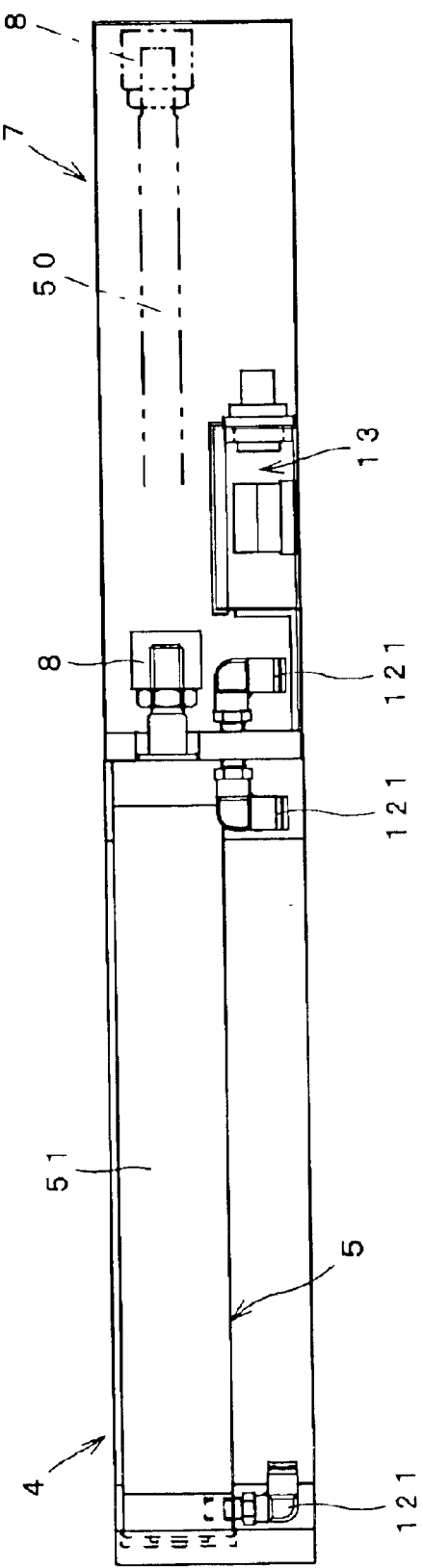
FIG. 10 is a front view illustrating the internal structure of the slidable gate valve.
Figure 11:
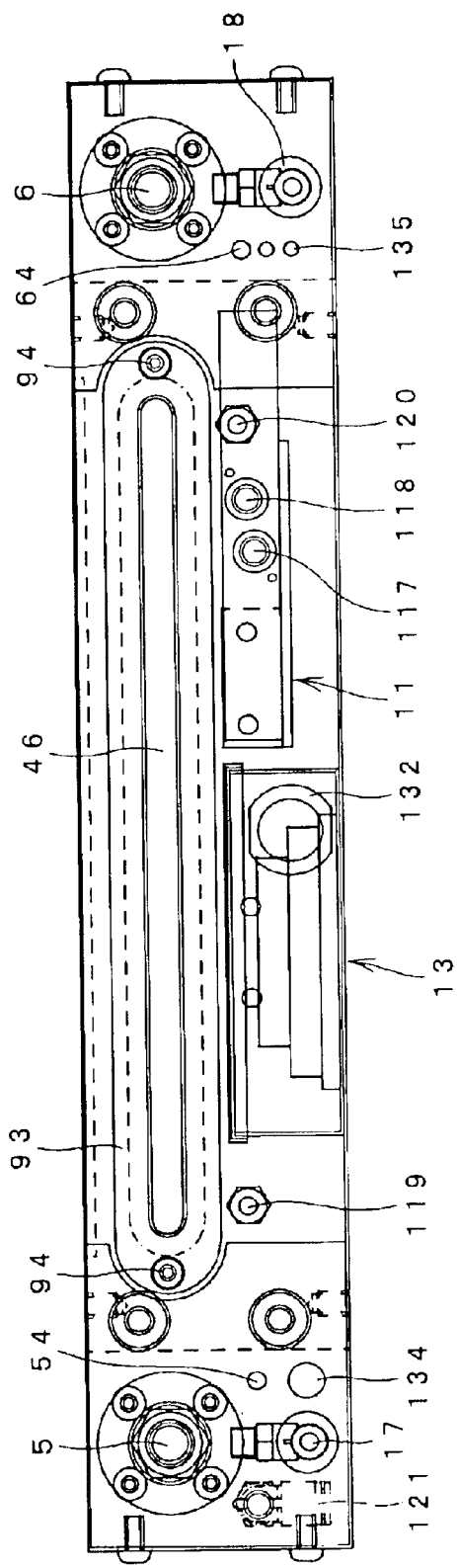
FIG. 11 is a sectional view taken on the line XIXI in FIG. 3.

The sealing member 9 is a wide, flat ring-shaped (flat oval-shaped) member that seals a sliding portion of the gate plate 2 as shown in FIGS. 6 and 11, and is attached to the guide slot 46 (see FIG. 11) formed in the frame body 4 and receives the gate plate 2 inserted therein. The sealing member 9 includes gland packing 92 pressed in a seal housing 91. The seal housing 91 has a jagged shape (wavy shape) with a round end and includes flat ring-shaped (flat oval-shaped) steps 90 (90a and 90b). Although the jagged shape is preferable, the seal housing 91 may be in any other suitable shape, for example, bamboo shoot-like shape, a knotted shape or a bevel-like shape. The multiple (two in this embodiment) steps 90a and 90b are provided at a preset interval. The seal housing 91 has a rear opening, in which a seal presser 93 including a smaller-diametral element 93a on one end is fitted. The smaller-diametral element 93a of the seal presser 93 bites into the upper portion of the gland packing 92 for fixation. The seal press 93 has a wide, flat ring shape (flat oval shape) and is fixed to the front frame member 42 with multiple (two in this embodiment) screws 94 (see FIG. 11). The gland packing 92 is interposed between the gate plate 2 and the inner wall of the seal housing 91 to form the steps of the jagged shape. As shown in FIG. 6(b), the inner wall of the seal housing 91 has an inclined face 95 that abruptly rises to be oriented almost perpendicular to the axis of the gate plate 2 (the sliding direction), a ring-shaped face 96 that is extended from the inclined face 95 to be oriented almost parallel to the axis of the gate plate 2 (the sliding direction), the step 90a that is extended from the ring-shaped face 96, a ring-shaped face 97 that is similar to the ring-shaped face 96 and is extended from the step 90a, the step 90b that is extended from the ring-shaped face 97, a ring-shaped face 98 that is similar to the ring-shaped face 97 and is extended from the step 90b, and an opening end that is extended from the ring-shaped face 98. A step is formed at the opening on the side of the seal press 93. These faces and steps are formed in wide, flat ring shape (flat oval shape). In the prior art structure, the gland packing applies an identical pressure over the whole plane of the gate plate 2. In the structure of this embodiment, on the other hand, there is a variation in sealing pressure in the contact of the gate plate 2 with the gland packing 92. Mixture of stronger contact points and weaker contact points enhances the sealing effects. In the process of opening or closing the gate plate 2, especially in the process of opening, the gland packing 92 wipes out the powder and granular material adhering to the surface of the gate plate 2. This arrangement desirably interferes with leakage of the powder and granular material out of their moving path and prevents the gate plate 2 with the powder and granular material adhering thereto from being received in the holder case 7 and causing potential troubles, such as contamination and failure of the mechanism. The sealing member 9 accordingly attains the enhanced sealing property. A connection aperture 99 shown by the dotted line in FIG. 6(a) is formed to connect with the seal housing 91 and introduce the exhaust supplied from the air purge 119, which will be discussed later, into the seal housing 91. This keeps the inside of the seal housing 91 at a positive pressure and further enhances the sealing effects.

Description of Sealing Member 10

The sealing member 10 of a rectangular rim is attached to the circumference of the opening 3 to seal the clearance between the frame body 4 and the gate plate 2 appearing in the closed state of the opening 3. The sealing member 10 is a labyrinth packing and has one or multiple continuous rectangular recesses 10a formed in the lower face (bottom face) thereof. The powder and granular material are packed into the recesses 10a to attain a material seal. In the closed state of the opening 3 with the gate plate 2, this arrangement effectively prevents the powder and granular material accumulated on the gate plate 2 and the air from leaking down through the clearance between the edges of the gate plate 2 (three edges except the edge on the side of the holder case 7) and the inner circumference of the frame body 4. Namely this arrangement prevents leakage of the powder and granular material and the air in the moving path of the powder and granular material. The sealing member 10 of the labyrinth packing attains the enhanced sealing property and the reduced sliding resistance. The labyrinth structure also decreases the required number of the screws 94, thus desirably reducing the total number of parts and facilitating assembly.

Description of Air Unit 11

The air unit 11 is fixed to the front frame member 42 with a bracket 110 and has a solenoid valve unit 116 with an air inlet 111, supply ports 112 and 113, and exhaust ports 114 and 115 as shown in FIG. 3. The supply ports 112 and 113 are provided with speed controllers 117 and 118 (see FIG. 11) to regulate the stroke speed of the air cylinders 5 and 6. Quick joints 55 and 65 are attached to the air inlet 111 and the exhaust ports 114 and 115. The air purges 11 9 and 120 (see FIG. 11 ) and a primary air piping port 121 (see FIGS. 10 and 11) are disposed on the front frame member 42.

Description of Electric unit 13

The electric unit 13 is fixed to the front frame member 42 with a bracket 130 and has a cable terminal box 133 with terminals 131 and 132 as shown in FIG. 3 A primary electric wiring port 134 and a sensor lead wire 135 are disposed on the front frame member 42 as shown in FIG. 11. The cable terminal box 133 includes a controller 136 for actuating and controlling the cylinders 5 and 6 and the other related elements.

Operations, Functions, and Effects of Gate Valve 1

The actuation process starts in response to supplies of power and the air from the power source and the air source (for example, a compressor) to the air unit 11 and the electric unit 13. In the initial state, the air cylinders 5 and 6 are contracted to close the opening 3, and the powder material are accumulated on the gate plate 2. In response to a gate open signal output from the controller 136 to the solenoid valve unit 116, the air is flown through the primary air piping port 121 into the air inlet 111 and is supplied from the supply ports 112 and 113 into the cylinder tubes 51 and 61 of the air cylinders 5 and 6, while the air is discharged from the exhaust ports 11 4 and 115. The piston rods 50 and 60 then move forward and are extended to press out the gate plate 2 and turn the sensor switch 63 ON. The ON signal of the sensor switch 63 is transmitted through the sensor lead wire 135 to the controller 136, which outputs an air supply stop signal to the solenoid valve unit 116 to stop the piston rods 50 and 60 at a specific position on the right end expressed by the two-dot chain line in FIG. 3. This opens the opening 3 and allows the powder material to fall down through the opening 3.

On completion of transport of the powder material, a gate close signal is output from the controller 136 to the solenoid valve unit 116 to change over the connection of the solenoid valve unit 116. The air is then flown through the primary air piping port 121 into the air inlet 111 and is supplied from the supply ports 112 and 113 into the cylinder tubes 51 and 61 of the air cylinders 5 and 6, while the air is discharged from the exhaust ports 114 and 115. The piston rods 50 and 60 then move back and are contracted to turn the sensor switch 62 ON. The ON signal of the sensor switch 62 is transmitted through the sensor lead wire 135 to the controller 136, which outputs an air supply stop signal to the solenoid valve unit 116 to stop the piston rods 50 and 60 at a specific position expressed by the solid line in FIG. 3. This closes the opening 3 to prohibit passage of the powder material and make the powder material accumulated on the gate plate 2.

The guide rails 14 and 15 are coated with a resin, and the sealing member 10 is a labyrinth packing. The gate plate 2 moving inside the frame body 4 is clamped and guided by the sealing member 10 and the guide rails 14 and 15. This arrangement decreases the resistance of the sliding plane and reduces the abrasion to enhance the durability and the sealing property. The sealing member 9 seals the gate plate 2 to significantly heighten the sealing property. As shown in FIG. 6(a), the powder and granular material adhering to the upper portion of the gate plate 2 is brushed off by the sealing member 10 on the edge of the frame body 4 on the holder case side 7, before being brushed off by the sealing member 9. The sealing member 10 seals the clearance M (see FIG. 1) to significantly enhance the sealing property.

The gate plate 2 moves back and forth inside the holder case 7 and the frame body 4 with the movement of the air cylinders 5 and 6 to open and close the opening 3. The coupling rod 8 moves back and forth only inside the holder case 7. Contraction of the air cylinders 5 and 6 drags the gate plate 2 to close the opening 3. Extension of the air cylinders 5 and 6 presses the gate plate 2 to open the opening 3. This arrangement of the gate valve 1 attains both size reduction and cost reduction.

The air purges 119 and 120 introduce the exhaust of the air cylinders 5 and 6 into the pipes 17 and 18. The air is jetted out through the slits 21 and 22. Namely the exhaust of the air cylinders 5 and 6 is effectively utilized to prevent possible contamination of powder and granular material for different purposes like foods and medicines accumulating on bolts and other internal elements, thus attaining HACCP.

The modified structure of FIG. 4 does not include the guide rails 14 and 15, so that the gate plate 2 is supported by the projections 49 only in the closed state of the opening 3 with the gate plate 2. Absence of the guide rails 14 and 15 desirably simplifies the structure and reduces the manufacturing cost.

Figure 12:
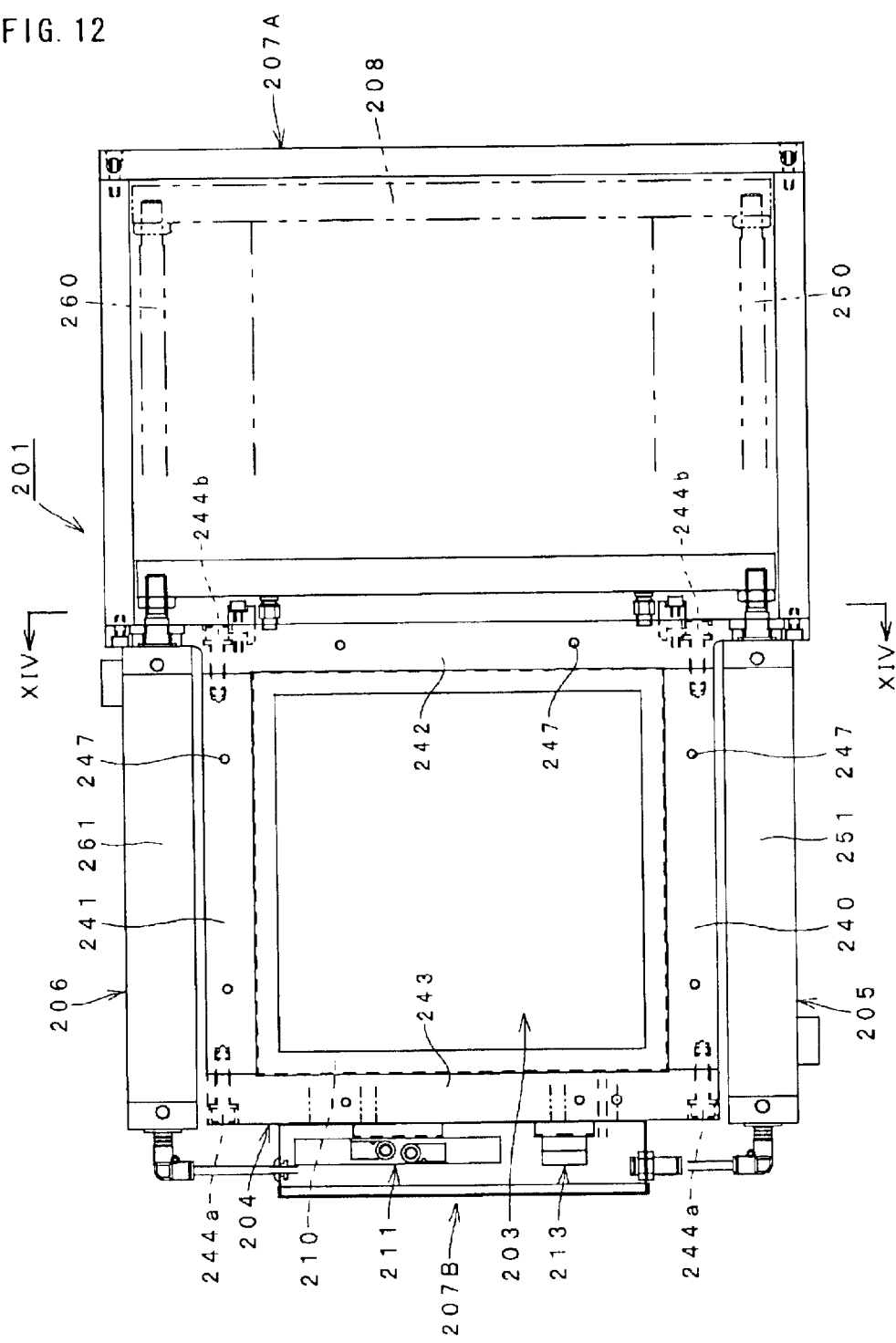
FIG. 12 is a plan view illustrating the internal structure of a slidable gate valve for powder and granular material in a second embodiment of the present invention.
Figure 13:
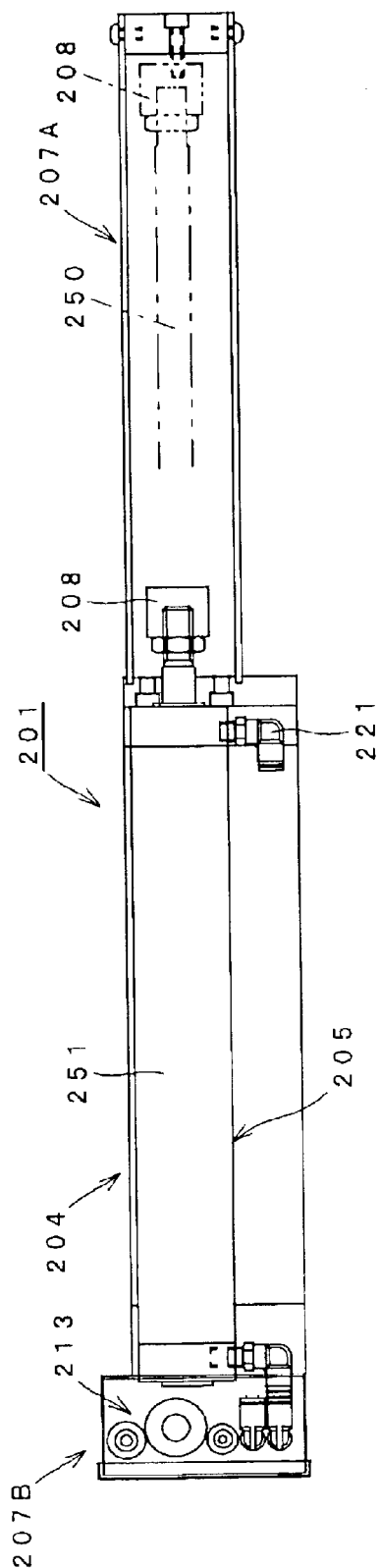
FIG. 13 is a front view illustrating the internal structure of the slidable gate valve.
Figure 14:
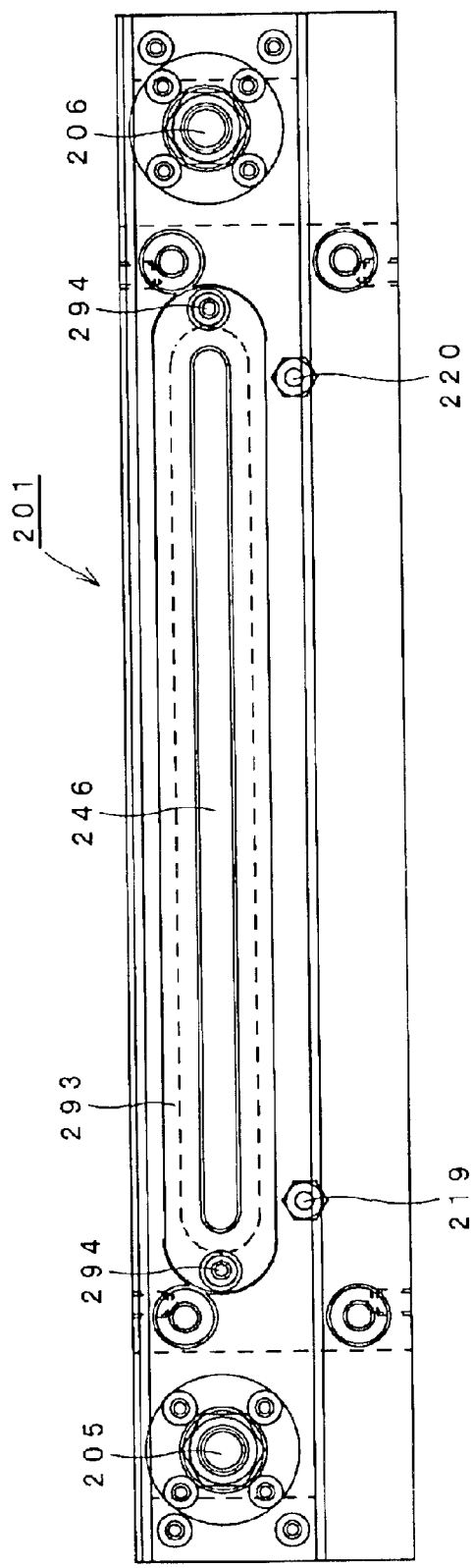
FIG. 14 is a sectional view taken on the line XIV—XIV in FIG. 12.

A gate valve 201 in a second embodiment of the present invention is discussed briefly with reference to FIGS. 12 through 14. In the structure of the first embodiment, the air unit 11 and the electric unit 13 are received in the holder case 7. In the structure of the second embodiment, on the other hand, the holder case 7 is replaced by a gate plate holder case 207A, and an air unit 211 and an electric unit 213 are received in a holder case 207B. The holder case 207B is attached to a rear frame member 243 to be exposed to outside and fastens the respective ends of air cylinders 205 and 206. This arrangement attains the similar operations, functions, and effects to those of the first embodiment, while advantageously facilitates inspection and maintenance of the air unit 211 and the electric unit 213. The construction of the second embodiment is similar to that of the first embodiment, except the above structure. Like elements to those of the first embodiment are expressed by like numerals with 200 and are not specifically described here.

The gate valve 1 or 201 is applicable to discharge, for example, from a dust collector, a cyclone separator, a conveyor, a reservoir, a silo, a check bottle, a blender, and a screw feeder as well as to gate of scale charging. The gate valve may be actuated by air cylinders, a manual mechanism, or a motor, and may have an adequate shape like circular or rectangular.

The above embodiments and their modifications and applications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. For example, the air cylinders 5 and 6 that utilize the air pressure to actuate the gate plate 2 may be replaced with any of cylinders and motors that utilize, for example, oil pressure or water pressure. Alternatively the gate plate 2 may be actuated by a manual mechanism. The air cylinders 5 and 6 are, however, preferable because of their high controllability.

Industrial Applicability

According to the arrangement of the present invention as described above, the step of the seal housing effectively prevents leakage of powder and granular material out of the moving path in the course of opening and closing the gate plate.

According to the arrangement of the present invention as described above, in the case of fine powder material, sealing the clearance effectively prevents leakage of powder material in the moving path while the opening is closed with the gate plate.

According to the arrangement of the present invention as described above, induction of exhaust from the air cylinder into the seal housing ensures the enhanced sealing property because of the exhaust pressure and attains effective use of the exhaust.

According to the arrangement of the present invention as described above, when the gate plate moves inside the frame body to close the opening, seal of the clearance and the labyrinth seal structure in contact with the gate plate effectively prevent leakage of powder and granular material in the moving path.

According to the arrangement of the present invention as described above, the gate plate is interposed between and guided by the sealing member and the guide rail. This arrangement ensures the smooth sliding movement and enhances the durability.

The arrangement of the present invention as described above the structure of supporting the gate plate is simplified and thereby attains size reduction of the whole device.

What is claimed is:

1. A slidable gate valve for powder and granular material, comprising:
   a frame body with an opening;
   an actuator attached to said frame body;
   a holder case connected to said frame body;
   a gate plate that is slid by said actuator in a direction perpendicular to a moving path of the powder and granular material, so as to open and close the opening;

a sealing member that comprises a packing pressed into a seal housing attached to a through hole formed in a specific area of said frame body on a side of said holder case and seals said gate plate from said frame body, so as to prevent leakage of the powder and granular material out of the moving path; and a support member that supports said gate plate, wherein said actuator is an air cylinder, and exhaust of said air cylinder is induced into said seal housing.

2. A slidable gate valve for powder and granular material in accordance with claim 1, wherein said support member comprises a guide rail that props up and guides said gate plate and is attached to said frame body to be extended in a direction of the sliding movement, and said gate plate is interposed and slid between said second sealing member and said guide rail to open and close the opening.

3. A slidable gate valve for powder and granular material in accordance with claim 1, wherein said support member comprises at least two projections that are disposed in an inner area of said frame body and prop up said gate plate when said gate plate closes the opening.

* * * * *